US011825251B2

(12) United States Patent
Weiss et al.

(10) Patent No.: US 11,825,251 B2
(45) Date of Patent: Nov. 21, 2023

(54) PUMP SENSOR SYSTEM

(71) Applicant: Cornell Pump Company, Clackamas, OR (US)

(72) Inventors: Aaron Weiss, Portland, OR (US); Ituah Rodriguez, Portland, OR (US); Adam Lindeman, Portland, OR (US); Grayson Fleming, Clackamas, OR (US); Andrew Enterline, Troutdale, OR (US)

(73) Assignee: CORNELL PUMP COMPANY, LLC, Clackamas, OR (US)

( * ) Notice: Subject to any disclaimer, the term of this patent is extended or adjusted under 35 U.S.C. 154(b) by 175 days.

(21) Appl. No.: 17/332,095

(22) Filed: May 27, 2021

(65) Prior Publication Data

US 2021/0409845 A1 Dec. 30, 2021

Related U.S. Application Data

(60) Provisional application No. 63/043,903, filed on Jun. 25, 2020.

(51) Int. Cl.
*H04Q 9/00* (2006.01)
*H04W 4/38* (2018.01)
(Continued)

(52) U.S. Cl.
CPC .............. *H04Q 9/00* (2013.01); *F04D 27/001* (2013.01); *G01K 1/024* (2013.01); *G01K 1/14* (2013.01);
(Continued)

(58) Field of Classification Search
CPC . G01K 7/00; G01K 1/14; G01K 1/024; G01P 15/18; H04Q 9/00
See application file for complete search history.

(56) References Cited

U.S. PATENT DOCUMENTS 6,006,164 A * 12/1999 McCarty ............. G01M 13/028
702/56
8,154,417 B2 * 4/2012 Hauenstein ............ G01H 1/003
417/63
(Continued)

FOREIGN PATENT DOCUMENTS

CN 202158059 U * 3/2012
CN 202348898 U 7/2012
(Continued)

OTHER PUBLICATIONS

International Search Report and Written Opinion issued in corresponding International Application No. PCT/US2021/034478, dated Sep. 21, 2021, 12 pages.

*Primary Examiner* — Jamel E Williams
(74) *Attorney, Agent, or Firm* — Snyder, Clark, Lesch & Chung, LLP

(57) ABSTRACT

A device, system, and methods are provided for remotely monitoring pump equipment. A sensor device is provided as a one-piece unit that is mechanically mounted to a pump by a single threaded connection. The sensor device includes a vibration sensor and temperature sensor. The sensor device connects to a user device via a wireless personal area network (WPAN) connection to upload a current snapshot of vibration data and temperature data for the pump equipment. An application on the user device may add location data for the time of the data collection and connects to a provider network to upload the vibration data and temperature data.

18 Claims, 7 Drawing Sheets

(51) Int. Cl.
    *H04W 76/10* (2018.01)
    *F04D 27/00* (2006.01)
    *G01K 1/024* (2021.01)
    *G01K 1/14* (2021.01)
    *G01K 7/00* (2006.01)
    *G01P 15/18* (2013.01)
    *H04W 4/02* (2018.01)

(52) U.S. Cl.
    CPC ............... *G01K 7/00* (2013.01); *G01P 15/18* (2013.01); *H04W 4/02* (2013.01); *H04W 4/38* (2018.02); *H04W 76/10* (2018.02); *H04Q 2209/43* (2013.01)

(56) References Cited

U.S. PATENT DOCUMENTS

| | | | | |
|---|---|---|---|---|
| 9,335,758 | B2 * | 5/2016 | Liu | ............ G01N 29/14 |
| 2006/0053886 | A1 * | 3/2006 | Langer | ............ F16C 19/527 |
| | | | | 73/507 |
| 2016/0047706 | A1 * | 2/2016 | Maruta | ............ G01H 17/00 |
| | | | | 73/49.1 |
| 2018/0060155 | A1 * | 3/2018 | Tran Van | ............ G06F 11/079 |
| 2018/0313707 | A1 * | 11/2018 | Schumacher | ............ E21D 21/02 |
| 2019/0271349 | A1 * | 9/2019 | Madru | ............ G01B 11/16 |
| 2019/0339162 | A1 * | 11/2019 | Munk | ............ G01N 29/036 |
| 2020/0182684 | A1 * | 6/2020 | Yoskovitz | ............ G01V 3/081 |
| 2020/0200417 | A1 * | 6/2020 | Wacker | ............ F24F 11/38 |

FOREIGN PATENT DOCUMENTS

| | | | | |
|---|---|---|---|---|
| CN | 106771355 | A | 5/2017 | |
| CN | 208984342 | U * | 6/2019 | |
| DE | 202012012274 | U1 * | 4/2013 | ............ G01K 1/14 |
| EP | 3492821 | A2 | 6/2019 | |
| JP | 2003214452 | A * | 7/2003 | |
| JP | 5716138 | B1 | 5/2015 | |
| KR | 101280292 | B1 | 7/2013 | |
| WO | WO-2020128685 | A1 * | 6/2020 | ............ G01M 1/22 |

\* cited by examiner

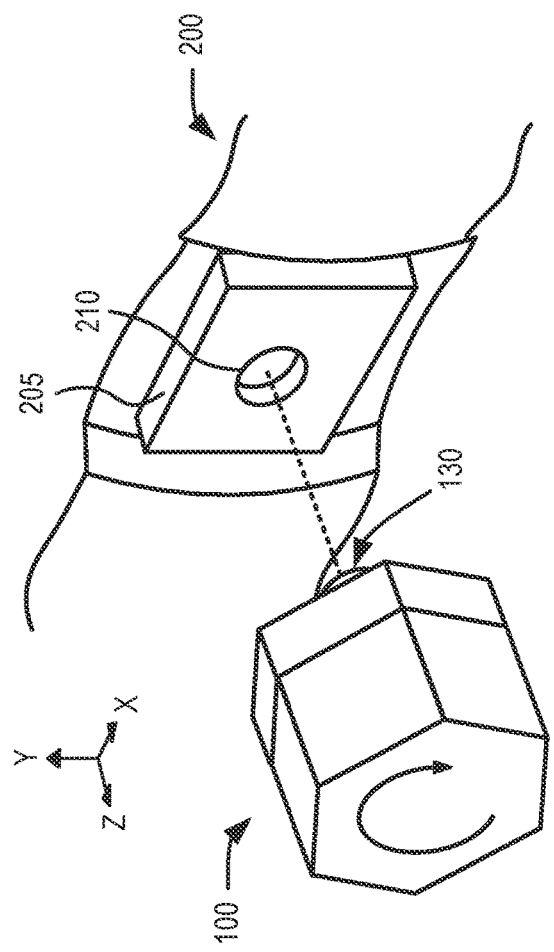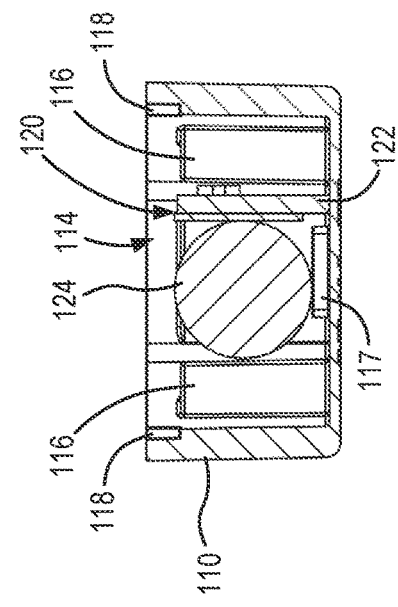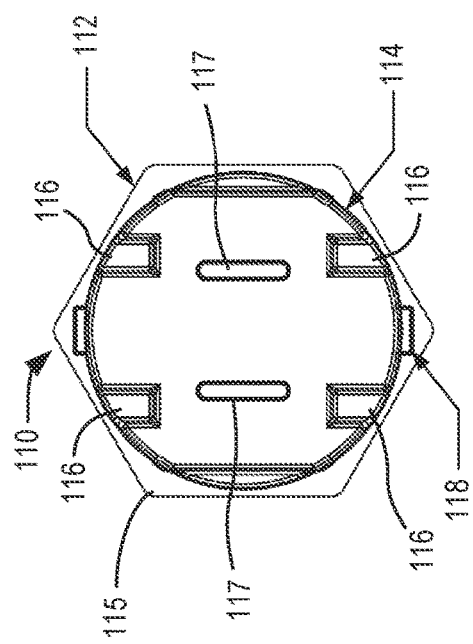

PUMP SENSOR SYSTEM

CROSS-REFERENCE TO RELATED APPLICATION

This application claims priority to under 35 U.S.C. § 119, based on U.S. Provisional Patent Application No. 63/043,903 filed Jun. 25, 2020, titled "Pump Sensor System," the disclosure of which is hereby incorporated by reference.

BACKGROUND OF THE INVENTION

Pumps have traditionally been monitored with two different techniques. With one of these techniques, pump data from pressure sensors, temperature sensors, and vibration sensors is sent to programmable logic controllers (PLC) and fed to supervisory control and data acquisition (SCADA) systems. These types of systems are not cost effective or practical for portable pumps.

With another technique, devices such as handheld vibration devices, temperature probes, pressure gauges, and the like, are used to perform periodic manual monitoring. Such periodic monitoring is typical for portable pumping systems and pumping systems without SCADA systems. This monitoring requires someone physically being present at the pump, the timing of which may not coincide with initial pump degradation or failure. Furthermore, periodic manual monitoring provides a measure of a pump condition only for the snapshot in time for which it is taken.

BRIEF DESCRIPTION OF THE DRAWINGS

FIG. 4 is an installation assembly view of the sensor device of FIG. 1 and a portion of pump equipment;

FIG. 5A is a bottom view of the top enclosure of the sensor device of FIG. 1;

FIG. 5B is a side cross-sectional view of the top enclosure with an electronics assembly installed;

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Systems and methods described herein provide a sensor system that gives pump users the ability to obtain a snapshot of pump data, and particularly vibration and temperature data, remotely. A sensor device is provided as a single unit that mechanically attaches to an outside surface of a pump and detects vibration and temperature. According to an implementation, the sensor device is threadedly attached to the pump using a single bolt. The sensor device may use a wireless personal area network (WPAN) communication interface to transmit the data to a mobile application on a user device. Each time the user device interacts with the sensor device, the mobile application provides a data log to a cloud-based application server, along with location information of the user device.

According to an implementation, the sensor device may serve as a gateway to pump information for a particular pump associated with the sensor device, such as pump curves, drawings, operations and maintenance (O&M) manuals, bill of materials, etc. When the sensor device is communicatively coupled to the mobile application, the aforementioned pump information may be available for display on the mobile device.

According to an implementation, the sensor device includes a metal bolt for mounting to a pump. The bolt is molded into, and extends out of, an enclosure that holds an electronics assembly. The enclosure may be of plastic molded into, for example, a hexagonal shape. The sensor device may be screwed into a tapped mounting hole on the pump casing. The electronics assembly may provide sensor and communication functions with low-cost and low-power components. The sensing device may be equipped with a battery that provides a minimum five-year battery life under intended usage.

In contrast to conventional pump monitors, systems and methods described herein provide a disposable sensing device configured for direct physical attachment, as a single unit, to pump equipment. In one implementation, the sensing device includes a sealed casing against dust or spray (e.g., sufficient for an IP65 ingress protection rating). In another implementation, the sealed casing may provide protection against high pressure spray (e.g., sufficient for an IP66 ingress protection rating). The sensing device includes an internal battery and an electronics unit that supports monitoring of internal vibration and temperature, along with sending time-stamped snapshot data over a WPAN. The sensing device may be provided as a sealed, disposable component to supplement data collection for new and existing pump assemblies.

Figure 1:
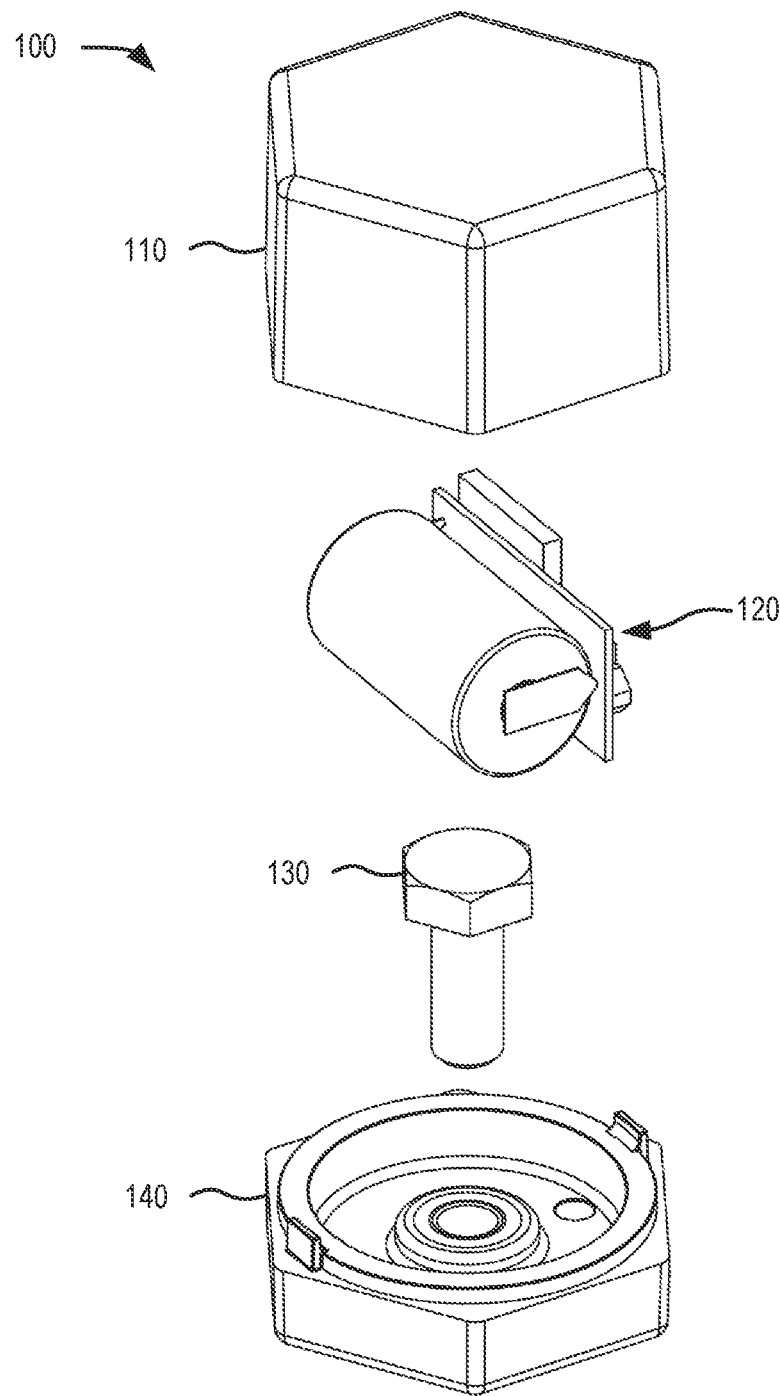
FIG. 1 is a schematic exploded view of a sensor device according to an implementation described herein.
Figure 3:
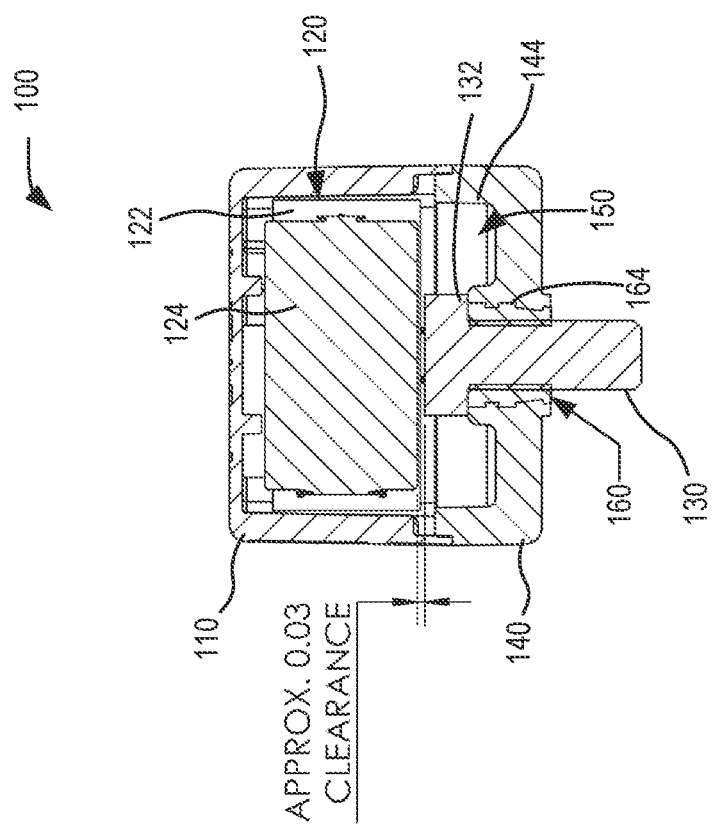
FIG. 3 is a side cross-sectional view of the sensor device of FIG. 1 taken along section A-A in FIG. 2.
Figure 2:
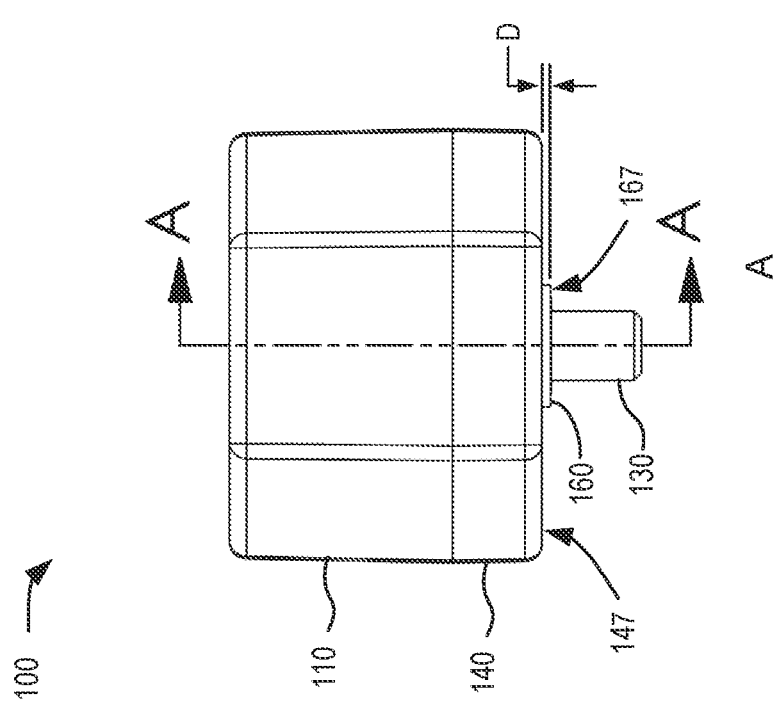
FIG. 2 is a side view of the sensor device of FIG. 1.

FIG. 1 is a schematic exploded view of a sensor device 100, according to an implementation described herein. FIG. 2 is a side view of sensor device 100 in an assembled configuration; and FIG. 3 is a side cross-sectional view of sensor device 100 along section A-A of FIG. 2. Referring collectively to FIGS. 1-3, sensor device 100 may include a top enclosure 110, an electronics assembly 120, an attachment bolt 130, and a base enclosure 140.

Top enclosure 110 and base enclosure 140 may be joined together to form a substantially enclosed cavity 150 therein. Electronics assembly 120 and a portion of attachment bolt 130 may be secured within cavity 150. More particularly, electronics assembly 120 may be potted within cavity 150 after top enclosure 110 and base enclosure 140 are joined. Top enclosure 110 and base enclosure 140 may be made from a plastic material, such as a thermoplastic polymer, like polyphenylene sulfide (PPS), or a thermoset polymer. Top enclosure 110 and base enclosure 140 may be formed by a molding process or 3D printing process, for example.

According to an implementation, top enclosure 110 and base enclosure 140 may be permanently sealed over the electronics assembly 120 contained within cavity 150.

FIG. 4 is a schematic assembly view of sensor device 100 and a portion of pump equipment 200. As shown in FIG. 4, pump equipment 200 may include a mounting surface 205 onto which sensor device 100 may be attached. Mounting surface 205 may be a flat machined surface with a tapped mounting hole 210. In one implementation, mounting surface 205 may be on or part of the bearing housing of pump equipment 200. Mounting hole 210 may be configured as a threaded receiving bore to receive a portion of threaded bolt 130. As described further herein, bolt 130 may be integral with sensor device 100 such that insertion of threaded bolt 130 into mounting hole 210 attaches sensor device 100 to mounting surface 205/pump equipment 200. Attaching sensor device 100 to pump equipment 200 using a single bolt may simplify installation and eliminate manufacturing challenges of aligning multiple threaded connectors with multiple tapped mounting holes on mounting surface 205. When attached to mounting surface 205, pump indicators, such a vibration and temperature, can be detected by sensors internal to sensor device 100.

Bolt 130 may include a threaded metal bolt. Bolt 130 may be made from, for example, stainless steel, zinc, and/or another metal material. Bolt 130 may be configured to correspond to (e.g., threadedly engage with) tapped mounting hole 210 in pump equipment 200. In one implementation, bolt 130 may be a standard size bolt, such as a ¼ in.×¾ in. hex head bolt. As shown in FIG. 4, for example, bolt 130 may be inserted into tapped mounting hole 210 by twisting the entire sensor device 100 (e.g., by hand tightening or using an optional torque wrench). When bolt 130 of an assembled sensor device 100 is screwed into tapped mounting hole 210, pump vibration and heat (e.g., temperature) from pump equipment 200 may be transmitted through bolt 130 to electronics assembly 120.

Electronics assembly 120 may detect and report vibration and temperature data associated with pump equipment 200 to which sensor device 100 is attached. As shown in FIGS. 1 and 3, for example, electronics assembly 120 may include a printed circuit board (PCB) 122 to which a battery 124 and powered components described herein may be connected. As described further herein in connection with FIG. 10, electronics assembly 120 may include a vibration sensor, a temperature sensor, a wireless communication interface and a variety of other logical components to communicate readings, from the vibration sensor and the temperature sensor, to a nearby user device.

FIG. 5A is a bottom view of top enclosure 110, and FIG. 5B is a side cross-sectional view of top enclosure 110 with electronics assembly 120 installed. As shown in FIGS. 5A and 5B, for example, top enclosure 110 may include a hexagonal perimeter 112 and a generally cylindrical opening 114 through a bottom surface 115 to receive electronics assembly 120. Ribs 116 may extend partially down from the enclosed end of cylindrical opening 114. Pillow blocks 117 may be located at the closed end of cylindrical opening 114 and provide a raised surface to support battery 124. Ribs 116 and pillow blocks 117 collectively support/orient electronics assembly 120 during assembly. More particularly, ribs 116 and pillow blocks 117 may be configured to maintain receive PCB 122 in a substantially vertical orientation (e.g., perpendicular to surface 147) prior to potting. Alignment tab slots 118 may be oriented with alignment tabs 148 of base enclosure 140 to facilitate proper orientation of top enclosure 110 relative to base enclosure 140 during assembly.

Figure 6B:
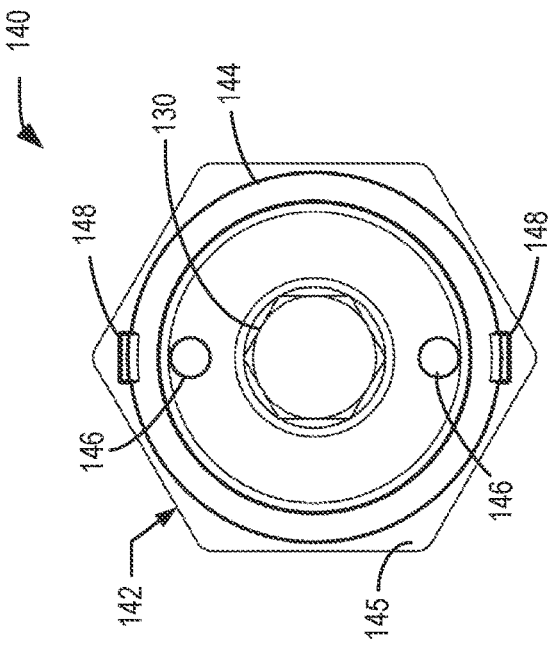
FIG. 6B is a top view of the base enclosure of the sensor device of FIG. 1 with a bolt inserted through the threaded insert.
Figure 6A:
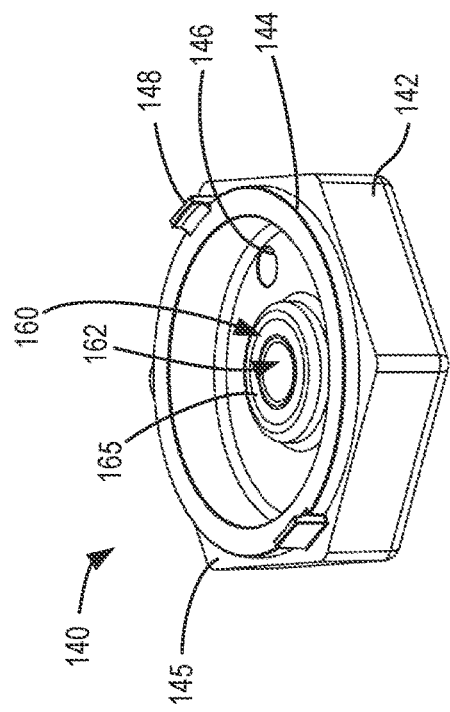
FIG. 6A is a perspective view of the base enclosure of the sensor device of FIG. 1 including a threaded insert.
Figure 7:
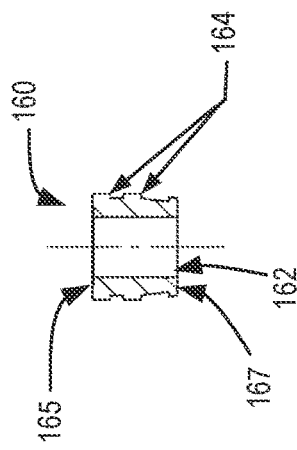
FIG. 7 is a side cross-section view of the threaded insert of FIG. 3.

FIG. 6A is a perspective view of base enclosure 140 including a threaded insert 160. FIG. 6B is a top view of the base enclosure of the sensor device of FIG. 1 with bolt 130 inserted through threaded insert 160. As shown in FIGS. 6A and 6B, for example, base enclosure 140 may include a hexagonal perimeter 142, a placement ring 144, vent/fill holes 146, and alignment tabs 148. Hexagonal perimeter 142 may correspond in size to hexagonal perimeter 112 of top enclosure 110, such that bottom enclosure 140 and top enclosure 110, when joined as shown in FIGS. 2 and 4, form a single continuous piece. Placement ring 144 may form a substantially circular ridge along a top surface 145 of base enclosure 140. Placement ring 144 may be configured to fit inside cylindrical opening 114 when top surface 145 mates to bottom surface 115 of top enclosure 110. Alignment tabs 148 may be aligned with alignment tab slots 118 of top enclosure 110 to provide proper orientation of a hexagonal perimeter 142 with hexagonal perimeter 112.

Vent/fill holes 146 may provide access to cavity 150 (e.g., FIG. 3) after electronics assembly 120 is inserted into top enclosure 110, bolt 130 is inserted into base assembly 140, and top enclosure 110 and base enclosure 140 are assembled (or joined together) over electronics assembly 120. Vent/fill holes 146 may be used to fill cavity 150 with a potting material (e.g., epoxy). According to an implementation, one of vent/fill holes 146 may be used to inject the potting material while another of vent/fill holes 146 may be used to vent air from cavity 150.

Threaded insert 160 may be included within base enclosure 140. Threaded insert 160 may be formed from metal material, such as the same type of metal material used for bolt 130. According to an implementation, base enclosure 140 may be molded around threaded insert 160. Threaded insert 160 may include a threaded axial bore 162 configured to receive threads of attachment bolt 130. More particularly, as shown in the orientation of FIGS. 3 and 6A, bolt 130 may be inserted past top surface 165 into the threaded axial bore 162 of threaded insert 160 until the head 132 of bolt 130 contacts the top surface 165 of threaded insert 160.

Threaded insert 160 may include retention ridges 164 to engage base enclosure 140 and prevent axial and/or rotational movement of threaded insert 160 relative to base enclosure 140. As shown, for example, in FIG. 2, threaded insert 160 may protrude slightly beyond a bottom surface 147 of base enclosure 140 at a distance "D." According to one implementation, distance "D" may be about 0.03 inches (0.762 mm). The protrusion of threaded insert 160 exposes surface 167 to contact mounting surface 205 (FIG. 4) when sensor device 100 is installed (e.g., when bolt 130 is fully screwed into tapped mounting hole 210). The protruding configuration of threaded insert 160 may prevent contact of base enclosure 140 with the pump equipment 200 when bolt 130 is inserted into mounting hole 210. The protruding configuration of threaded insert 160 may protect plastic materials of base enclosure 140 from direct heat transfer with pump equipment 200 and may ensure a metal-to-metal contact with the mounting surface 205. The metal-to-metal contact may provide better heat transfer (e.g., for temperature sensing) and mechanical contact (e.g., for vibration sensing) than, for example, a plastic-to-metal interface. Thus, the configuration of threaded insert 160 provides beneficial mechanical properties, while enabling use of a low-cost plastic housing materials for base enclosure 140 that are desirable for a disposable sensor.

Figure 8B:
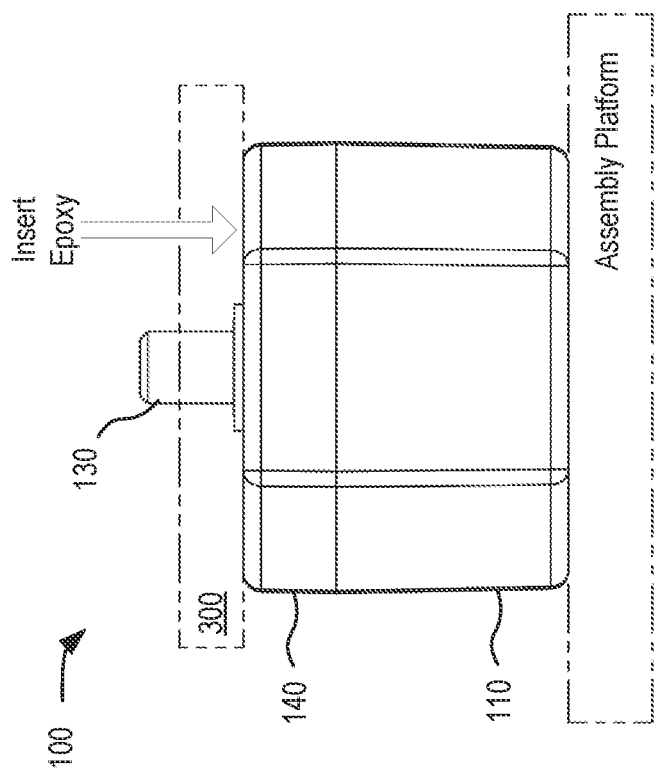
FIGS. 8A and 8B are partial assembly illustrations for the sensor device of FIG. 1.
Figure 8A:
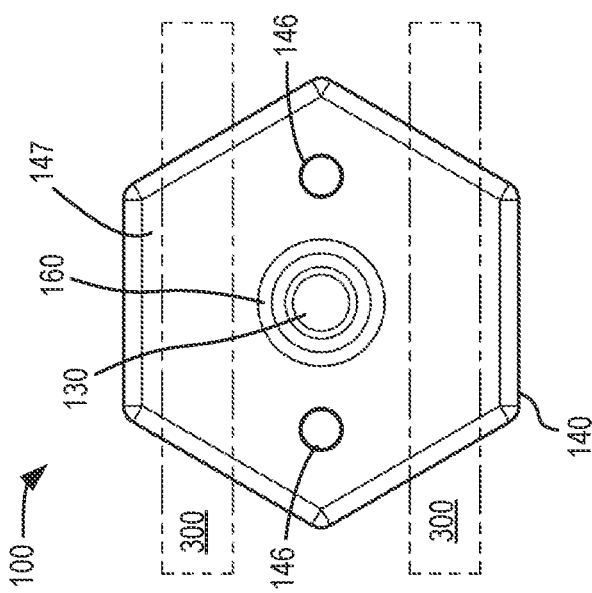

FIG. 8A is a bottom view of sensor device 100, and FIG. 8B is a side view of sensor device 100, oriented upside down on an assembly platform with holding bars 300. As shown in FIGS. 8A and 8B, in a partially-assembled configuration, electronics assembly 120 and bolt 130 are inserted into top enclosure 110 and base enclosure 140, respectively, and top enclosure 110 and base enclosure 140 are joined together (e.g., at surfaces 115/145, shown in FIGS. 5 and 6B) using alignment tabs 148 for correct orientation. According to one implementation, after calibration and testing of electronics assembly 120, top enclosure 110 and base enclosure 140 may be joined using an adhesive, such as a fast-drying cyanoacrylate-based adhesive, between surfaces 115/145. In another implementation, as shown in FIGS. 8A and 8B, holding bars 300 may be applied to base enclosure 140 to force together surfaces 115/145. Holding bars 300 may include any material to which weight/force can be applied to keep surfaces 115/145 in contact during potting operations. With either adhesive and/or holding bars 300 in place, epoxy may be injected through one of holes 146 into cavity 150. According to an implementation, epoxy may be inserted until cavity 150 is completely filled and the epoxy is level with surface 147. The epoxy may cure in cavity 150 and bond to surfaces of top enclosure 110, electronics assembly 120, bolt 130, and base enclosure 140 to form a mechanical coupling between pump equipment 200 and electronics assembly 120 when sensor device 100 is installed in tapped mounting hole 210. The cured epoxy may form a permanent seal for sensor device 100 that protects electronics assembly 120 against dust or spray (including high pressure spay) and ensures a tamperproof disposable component.

Figure 9:
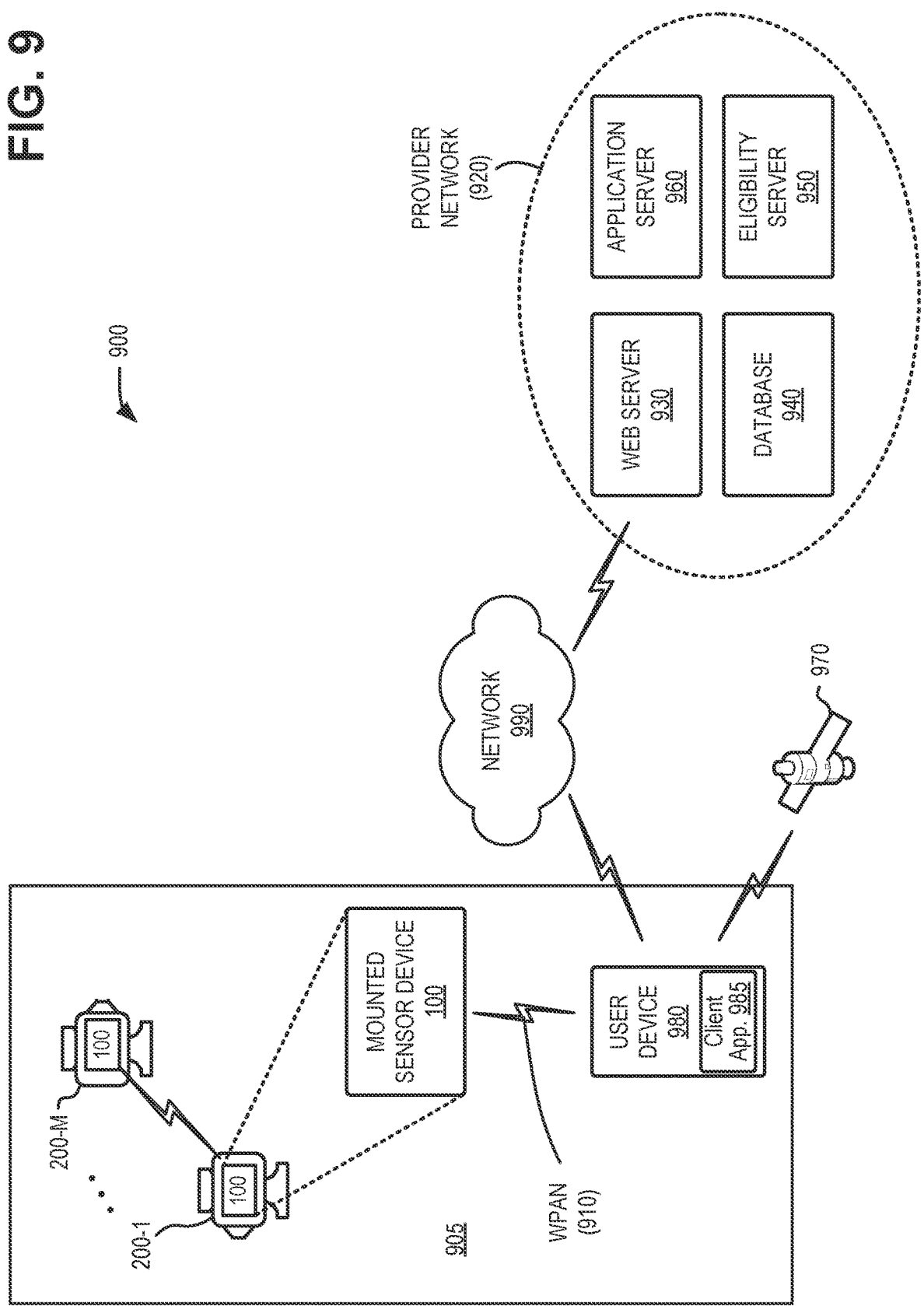
FIG. 9 is a diagram of a network environment in which systems and methods described here may be implemented.

FIG. 9 is a diagram illustrating an exemplary environment 900 in which systems and/or methods described herein may be implemented. As illustrated, environment 900 may include pump equipment 200-1 through 200-M (collectively and individually referred to herein as "pump equipment 200"). Each of pump equipment 200 may include a mounted sensor device 100 (collectively referred to herein as "sensor devices 100"). Pump equipment 200 with mounted sensor devices 100 may be distributed throughout customer premises 905, such as an industrial or agricultural environment. Environment 900 may also include a provider network 920 with a database 940, an eligibility server 950, and an application server 960; a global positioning system 970; user devices 980-1 through 980-N (collectively referred to herein as "user devices 980" and individually as "user device 980"), and a third-party device 980 interconnected by a network 990. Components of environment 900 may be connected via wired and/or wireless links.

Pump equipment 200 may include a pump, such as a centrifugal pump or another type of pump, which may be monitored using vibration and temperature readings. Sensor device 100 may be attached to pump equipment 200; collect vibration, temperature, and other data; and provide collected data to user device 980. According to an implementation, sensor device 100 may communicate with user device 980 via WPAN 910. WPAN 910 may use, for example, IEEE 802.15 standards or variations thereof to conduct sort range wireless communications.

Provider network 920 may include network devices, computing devices, and other equipment to provide services, including services for customers with sensor devices 100. For example, devices in provider network 920 may supply backend services to user devices 980 for remotely monitoring pump equipment 200. Provider network 920 may include, for example, one or more private Internet Protocol (IP) networks that use a private IP address space. Provider network 920 may include a local area network (LAN), an intranet, a private wide area network (WAN), etc. According to an implementation, provider network 920 may use vendor-specific protocols to support Internet-of-Things (IoT) management. In another implementation, provider network 920 may include a hosting platform that provides an IoT data service. The IoT data service may include receiving packets that are transmitted by client application 985 (e.g., running on user device 980) and implementing models to collect, store, analyze, and/or present event data from sensor devices 100. The hosting platform may also provide data-driven applications and/or analytics services for user devices 980 that owners of sensor devices 100 may use. Examples of hosting platforms that may use different protocols and commands include Amazon® Web Services (AWS), Microsoft Azure®, IBM Watson®, Verizon® ThingSpace®, etc. Although shown as a single element in FIG. 9, provider network 920 may include a number of separate networks.

Web server 930 may include one or more network or computational devices to manage service requests from eligible user devices 980. In one implementation, web server 930 may provide an application (e.g., an event data management application) and/or instructions to user device 980 to enable user device 980 to receive and respond to information related to pump equipment 200. In another implementation, as described further herein, web server 930 may provide multiple types of browser-based user interfaces to facilitate individual pump monitoring, system monitoring, receive alerts, receive notifications, etc. Web server 930 may receive settings from user devices 980, may process/collate the received settings, and may forward the settings to application server 960 for implementation.

Database 940 may include one or more databases or other data structures to store data uploads from sensor devices 100 via user device 980, reporting/monitoring configurations, device registrations (e.g., provided by user devices 980 via web server 930) and/or user registrations. In one implementation, database 940 may also store data retrieved from and/or used by eligibility server 150.

Eligibility server 950 may include one or more network or computational devices to provide backend support for authorizing user devices 980 to use provider network 920. For example, eligibility server 950 may store identification information for registered users and/or user devices 980. The information may be used to verify that a particular user/user device 980 has access to services and/or information provided by provider network 920. Upon verifying eligibility of a user/user device 980, eligibility server 950 may, for example, provide access to other devices in provider network 920.

Application server 960 may include one or more network or computational devices to perform services accessed through web server 930. For example, application server 960 may manage downloading applications provided to user devices 980 and/or may process incoming data (e.g., data forwarded from sensor devices 100) for storage in database 940. According to an implementation, application server 960 may use a series of APIs to send and receive data from client application 985.

Positioning system 970 may include one or more devices configured to provide location information for user devices 980. In some implementations, location information may include, for example, GPS information or another form of global navigation satellite system (GNSS) information. In one implementation, positioning system 970 may include one or more cellular towers, wherein user devices may retrieve location information in the form of cellular tower triangulation information. Additionally, or alternatively, positioning system 970 may include a GPS satellite to determine a location of user device 980.

User device 980 includes a device that has computational and wireless communication capabilities. User device 980 may be implemented as a mobile device, a portable device, a stationary device, a device operated by a user, or a device not operated by a user. For example, user device 980 may be implemented as a smartphone, a computer, a tablet, a wearable device, or some other type of wireless device. According to various exemplary embodiments, user device 980 may be configured to execute various types of software (e.g., applications, programs, etc.). As described further herein, user device 980 may download and/or register a client application 985. As described further herein, the client application 985 (or "app") may be configured to automatically detect sensor devices 100 when within relatively close proximity (e.g., a range of up to 100 feet). Client application 985 may extract from sensor device 100 a snapshot of current vibration and temperature data for the corresponding pump equipment 200. Using network 990, client application 985 may forward the vibration and temperature data to provider network 920 for storage and/or analysis.

According to an implementation, client application 985 may include a maintenance log functionality. When taking a measurement from sensor device 100 with user device 980/client application 985, the user may select an icon, displayed on client application 985, to take a snapshot measurement of the sensor values (e.g., from vibration sensor 1005, temperature sensor 1010), which are then displayed on user device 980. Client application 985 may provide an option for the user to append a note (e.g., voice or text user input) to the snapshot reading. The note data may timestamped and logged in a history page on client application 985. Additionally, the note data is pushed application server 960/database 940 for customers to view along with other account information.

Network 990 may include one or more wired, wireless and/or optical networks that are capable of receiving and transmitting data, voice and/or video signals. For example, network 990 may include one or more access networks, IP multimedia subsystem (IMS) networks, core networks, or other networks. The access network may include one or more wireless networks and may include a number of transmission towers for receiving wireless signals and forwarding wireless signals toward the intended destinations. The access network may include a wireless communications network that connects subscribers (e.g., sensor devices 100, user devices 980, etc.) to other portions of network 990 (e.g., the core network). In one example, the access network may include a long-term evolution (LTE) network. In other implementations, the access network may employ other cellular broadband network standards such as 3rd Generation Partnership Project (3GPP) 5G and future standards. Network 990 may further include one or more satellite networks, one or more packet switched networks, such as an IP-based network, a local area network (LAN), a wide area network (WAN), a wireless local area network (WLAN), an intranet, the Internet, or another type of network that is capable of transmitting data.

In FIG. 9, the particular arrangement and number of components of environment 900 are illustrated for simplicity. In practice there may be more sensor devices 100, provider networks 920, positioning systems 970, user devices 980, and/or networks 990. For example, there may be hundreds or thousands of sensor devices 100.

According to an implementation, a user with user device 980 may perform routine assessments of pump equipment 200 in customer premises 905. A user may bring user device 980 in proximity of sensor device 100 to initiate a transfer, via WPAN 910, of a current vibration and temperature reading for corresponding pump equipment 200. According to an implementation, sensor device 100 may also include a unique identifier associated with pump equipment 200. For example, a pump manufacture may cross-reference a unique ID of sensor device 100 with a unique ID of particular pump equipment during a manufacturing or refurbishing process. The association of the sensor device ID and the pump equipment ID may be stored, for example, in database 940. Client application 985 may obtain location data (e.g., from positioning system 970) associated with the time of the data transfer from sensor device 100 and forward the sensor data and location data to provider network 920.

Figure 10:
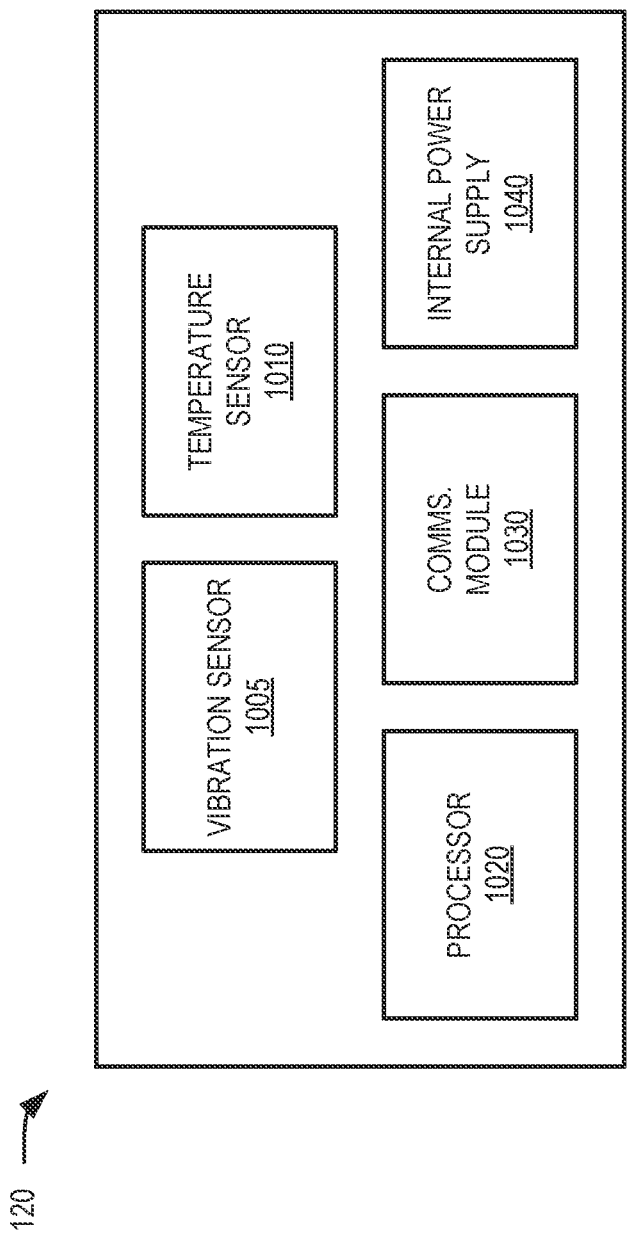
FIG. 10 is a block diagram illustrating logical components of the electronics assembly of FIG. 1.

FIG. 10 is a block diagram of internal components of sensor device 100, which may be included, for example, in electronics assembly 120. As shown in FIG. 10, sensor device 110 may include a vibration sensor 1005, a temperature sensor 1010, a processor 1020, a communications module 1030, and an internal power supply 1040. According to an implementation, one or more components may be installed on a printed circuit board 122, an etched wiring board, or a printed circuit assembly.

Vibration sensor 1005 may include accelerometers, signal amplifiers, and/or filters to detect and indicate sensed vibration in different directions. For example, vibration sensors 1005 may include a set of three accelerometers to measure vibration along three respective axes (e.g., x-, y-, and z-axes of FIG. 10). In another implementation, vibration sensors 1005 may measure vibration along two axes. According to one embodiment, the accelerometer may output a voltage proportional to the acceleration to an amplifier/filter. The amplifier/filter may convert the accelerometer reading to inches/second and provide the converted value to processor 1020 as a voltage output representing vibration in inches/second.

Temperature sensor 1010 may include a sensor to detect a temperature within potted cavity 150. The temperature of potted cavity 150 may be correlated to the temperature of the bearing housing of pump equipment 200. For example, changes in the bearing housing temperature will typically cause temperature changes to bolt 130/insert 160 of sensor device 100, which will cause proportional changes within potted cavity 150. In one implementation, temperature sensor 1010 may output an analog voltage value to processor 1020 as a voltage output representing temperature (e.g., in degrees Fahrenheit or Celsius).

Processor 1020 may include includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 1020 may be implemented as hardware (e.g., a microprocessor, etc.), a combination of hardware and software (e.g., a SoC, an ASIC, etc.) and may include one or multiple memories. For example, processor 1020 may include stored instructions to upload data snapshots and a stored unique identifier.

According to an implementation, processor 1020 includes a low-cost multi-purpose processor that obtains accelerometer data from vibration sensor 1005 and performs unique measurement calculations locally. The measurement calculations may minimize processor cycles and power requirements to provide vibration measurements for sensor device 100. Additionally, processor 1020 may manage wakeup cycles and manage other peripheral devices to minimize power consumption and extend battery life.

Processor 1020 may control the overall operation or a portion of operation(s) performed by sensor device 100. Processor 1020 may collect readings from vibration sensor 1005 and temperature sensor 1010. Processor 1020 may cause current data from vibration sensor 1005 and temperature sensor 1010 to be sent to user device 980 when a wireless connection (e.g., via WPAN 910) is detect and/or when requested by application 985. According to an implementation, processor 1020 may include a clock (e.g., a real-time counter) to generate a time stamp for snapshot data (e.g., data from vibration sensor 1005 and temperature sensor 1010) provided over WPAN 910. Processor 1020 may also be programmed to detect if readings from any sensors exceed a predetermined threshold value and generate an alert signal when a threshold is exceeded.

Communications module 1030 permits sensor device 110 to communicate with other devices, such as user device 980. According to implementations described herein, communication module 1030 includes a WPAN interface. For example, communication module 1030 may include a transmitter and a receiver, or transceivers. Communication module 1030 may include one or more antennas. Communication module 1030 may operate according to a communication standard, such as a Bluetooth® standard, non-standard short range wireless communications. Communication module 1030 may enable sensor device 100 to transfer data to user device 980 when user device 980 is within a relatively short distance of sensor device 100 (e.g., up to about 100 feet). Communication module 1030 may include various processing logic or circuitry (e.g., multiplexing/de-multiplexing, filtering, amplifying, converting, error correction, etc.). According to one implementation, may detect a connection signal from user device 980 and, in response, provide a current reading from vibration sensor 1005 and temperature sensor 1010. According to another implementation, communication module 1030 may be activated periodically to report a current reading from vibration sensor 1005 and temperature sensor 1010.

Internal power supply 1040 may include one or more batteries (e.g., a disposable battery) to power other components of sensor device 100. According to an implementation, internal power supply 1040 may provide, for example, a five-year battery life for a predicted duty cycle. In one implementation, internal power supply 1040 may include, for example, a lithium thionyl chloride battery for configured for low-power service.

Although FIG. 10 shows exemplary components of sensor device 100, in other implementations, sensor device 100 may contain fewer, different, differently-arranged, or additional components than depicted in FIG. 10. Additionally, or alternatively, a component of sensor device 100 may perform one or more other tasks described as being performed by another component of sensor device 100.

A device, system, and methods are provided for remotely obtaining sensor data for pump equipment. A sensor device for pump equipment is mechanically mounted to a pump. The sensor device includes an enclosure for an electronics assembly and bolt protruding from the enclosure. The bolt is configured to be inserted into a threaded receiving bore on the pump. The sensor device also includes a threaded insert. The threaded insert includes a threaded bore configured to receive the bolt. The threaded insert extends past an outside surface of the enclosure and prevents the enclosure from contacting the pump when the bolt is inserted into the threaded receiving bore. The electronics assembly includes a vibration sensor, a temperature sensor, a wireless communications interface for exchanging data with a user device, an internal battery, and a processor. The processor is configured to detect, via the wireless communication interface, a signal from the user device, and transmit, to the user device and via the wireless communication interface a unique identifier for the sensor device, a current reading from the vibration sensor, and a current reading from the temperature sensor.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such.

What is claimed is:

1. A sensor device for pump equipment, the sensor device comprising:
    an enclosure for an electronics assembly, wherein the enclosure includes a top enclosure portion and a base enclosure portion;
    a bolt protruding from the base enclosure portion, the bolt configured to be inserted into a threaded receiving bore of the pump equipment;
    a threaded insert, the threaded insert including a threaded bore configured to receive the bolt, the threaded insert extending past an outside surface of the base enclosure portion and preventing the enclosure from contacting the pump equipment when the bolt is inserted into the threaded receiving bore; and the electronics assembly comprising:
two or more internal sensors, the two or more internal sensors including a vibration sensor and a temperature sensor,
a wireless communications interface for exchanging data with a user device,
an internal battery, and
a processor configured to transmit, to the user device and via the wireless communications interface:
a unique identifier associated with the pump equipment,
a current reading from the vibration sensor, and
a current reading from the temperature sensor,
wherein the top enclosure portion and the base enclosure portion are joined and permanently sealed over the electronics assembly.

2. The sensor device of claim 1, wherein the sensor device is configured to attach to the pump equipment as a single piece.

3. The sensor device of claim 1, wherein the enclosure includes a plastic material, and wherein the threaded insert includes a metal material.

4. The sensor device of claim 1, wherein the threaded insert includes multiple ridges that engage the base enclosure portion to prevent axial movement of the threaded insert relative to the base enclosure portion.

5. The sensor device of claim 1, further comprising:
potting material within the enclosure that provides mechanical coupling among the enclosure, the bolt, and the electronics assembly.

6. The sensor device of claim 1, wherein the base enclosure portion further comprises a vent hole and a fill hole that provides access to a cavity of the enclosure when the base enclosure portion and the top enclosure portion are joined together, and wherein the enclosure further comprises:
potting material that fills the cavity.

7. The sensor device of claim 6, wherein the potting material prevents relative movement among the enclosure, the bolt, and the electronics assembly.

8. The sensor device of claim 1, wherein the top enclosure portion and the base enclosure portion form a cavity,
wherein the sensor device further includes cured potting material within the cavity to form a potted cavity, and
wherein the potted cavity provides a tamperproof component for the electronics assembly.

9. A system for monitoring pump equipment, the system comprising:
a sensor device including:
an enclosure for an electronics assembly, wherein the enclosure includes a top enclosure portion and a base enclosure portion;
a bolt protruding from the base enclosure portion, the bolt configured to be inserted into a threaded receiving bore of the pump equipment;
a threaded insert, the threaded insert including a threaded bore configured to receive the bolt, the threaded insert extending past an outside surface of the enclosure and preventing the enclosure from contacting the pump equipment when the bolt is inserted into the threaded receiving bore; and
the electronics assembly comprising:
a vibration sensor,
a temperature sensor,
a first wireless communications interface for exchanging data with a user device,
an internal battery, and
a processor configured to transmit, to the user device and via the first wireless communications interface:
a unique identifier associated with the pump equipment,
a current reading from the vibration sensor, and
a current reading from the temperature sensor,
wherein the top enclosure portion and the base enclosure portion are joined and permanently sealed over the electronics assembly.

10. The system of claim 9, further comprising:
a user device including:
a second wireless communications interface for exchanging data with the sensor device;
a memory to store instructions; and
a processor configured to execute the instructions to:
establish a communication session with the sensor device;
receive, from the sensor device, the unique identifier, the current reading from the vibration sensor, and the current reading from the temperature sensor, and
forward, to a provider network, the unique identifier, the current reading from the vibration sensor, and the current reading from the temperature sensor.

11. The system of claim 10, wherein the processor of the user device is further configured to:
identify a location of the user device at the time of receiving from the sensor device, the unique identifier, the current reading from the vibration sensor, and the current reading from the temperature sensor, and
forwarding the identified location with the unique identifier, the current reading from the vibration sensor, and the current reading from the temperature sensor.

12. The system of claim 10, further comprising:
a network configured to:
receive, from the user device, the unique identifier, the current reading from the vibration sensor, and the current reading from the temperature sensor, and
store the unique identifier, the current reading from the vibration sensor, and the current reading from the temperature sensor associated with other data for the pump equipment.

13. The system of claim 9, wherein the sensor device is configured to attach to the pump equipment as a single piece.

14. The system of claim 9, wherein the electronics assembly of the sensor device is potted within the enclosure and does not move relative to the bolt.

15. The system of claim 9, wherein the enclosure includes a plastic material, and wherein the threaded insert and the bolt include a metal material.

16. The system of claim 9, wherein the first wireless communications interface includes an interface for a wireless personal area network (WPAN).

17. The system of claim 9, wherein the enclosure for the sensor device includes a hexagonal perimeter having a standard bolt size.

18. The system of claim 9, further comprising:
the pump equipment, wherein the pump equipment includes the threaded receiving bore in a bearing housing of the pump equipment.

* * * * *